June 12, 1956　　　W. B. MARTIN　　　2,750,446
CODE TRANSLATING DEVICE
Filed Oct. 14, 1953
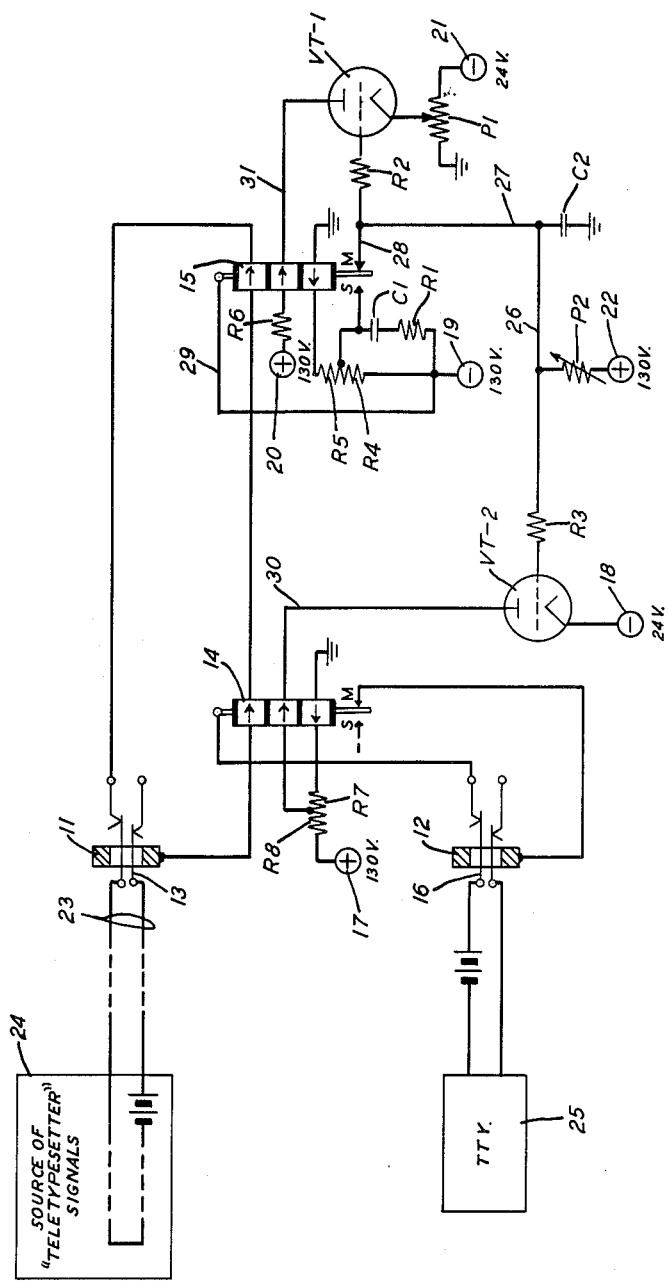
INVENTOR
W. B. MARTIN
BY R. C. Terry
ATTORNEY

United States Patent Office

2,750,446
Patented June 12, 1956

1

2,750,446

CODE TRANSLATING DEVICE

Wade B. Martin, Ramsey, N. J., assignor to American Telephone and Telegraph Company, a corporation of New York Application October 14, 1953, Serial No. 386,020

9 Claims. (Cl. 178—26)

This invention relates to telegraphic transmission and reception of signals employed for controlling line casting and composing machines, and more particularly to a circuit device for modifying the six-element code signals usally employed for controlling typesetting equipment to control five-unit teletypewriter recording equipment.

An object of the invention is to monitor, with five-unit teletypewriter apparatus, the six-element code signals transmitted over a telegraph line circuit.

Another object is to translate the six-element code signals to five-unit start-stop teletypewriter signals whereby the six-unit code signals may be monitored on five-unit start-stop teletypewriter equipment, which is more commonly and widely available than six-unit teletypewriter printers.

Heretofore in maintaining satisfactory service for automatic type-composing systems wherein a six-unit perforated tape is utilized in controlling both locally and remotely located composing machines of the line casting type, special six-unit printers have been used to record, for monitoring or other purposes, the text material represented by such signals. It has been recognized that equipping an office with six-unit start-stop signal teletypewriters for monitoring service may be difficult to justify from an economic standpoint, because they are inherently more complex than five-unit printers, and production costs are affected adversely by the relatively limited demand for six-unit equipment as compared with the extensively used five-unit equipment. Therefore, the converting device of the present invention provides an inexpensive substitute wherein the standard five-unit start-stop signal teletypewriter is employed therewith for monitoring purposes. These standard five-unit start-stop signal teletypewriters may be of the type disclosed in United States Patent 1,904,164, granted to S. Morton, H. L. Krum and E. E. Kleinschmidt on April 18, 1933, and one of them is usually already available at each telegraph test board and at various other places in telegraph systems. These teletypewriters are arranged to receive five-unit start-stop signals of the same unit signal speed as the six-unit signals. The code combinations for all letter characters and important functions resulting from the first five selecting pulses of the six-unit start-stop code as employed for controlling type-composing machines correspond exactly to those resulting from the five selecting pulses of the five-unit start-stop code, the sixth selecting pulse of the six-unit code being used exclusively for special typesetting functions. The five-unit start-stop signal teletypewriter could not be used to monitor directly on a six-unit code circuit because the teletypewriter would lose synchronism with the six-unit transmitter each time a character or function signal in which the sixth pulse is of spacing nature is received.

According to the present invention the converting device is connected intermediate a six-unit transmission system and a monitoring five-unit start-stop signal teletypewriter. The circuit device is arranged to permit the "start" pulse and the first five pulses of the six-unit start-

2 stop code combination incoming from the circuit to be repeated directly to the monitoring teletypewriter and the start pulse serves also to generate a marking pulse in lieu of the normal marking or spacing sixth pulse received from the circuit. The marking pulse generated by the converting device is combined with the normal "stop" pulse of the signal received from the circuit to appear to the monitoring teletypewriter as an elongated "stop" pulse and serves to maintain synchronism between the transmitter connected to the distant end of the circuit and the monitoring teletypewriter.

The single figure of the drawing shows a schematic arrangement of the converting device connected intermediate an incoming line circuit and a local circuit connected to a teletypewriter.

Referring to the figure the device for converting an incoming six-unit signal into an outgoing five-unit signal for registration on a monitoring teletypewriter consists of two parts, namely, the repeater and timer portions. The device is connected at a test board or any line termination to the tip and sleeve conductors of incoming jack 11 and outgoing jack 12. The incoming circuit is extended by means of plug 13 and jack 11, through the operating, or uppermost, windings, in series connection, of relay 14 of the repeater portion and relay 15 of the timer portion. Repeater relay 14 is arranged to repeat the "start" pulse and the first five selecting pulses of an incoming six-unit signal directly to the outgoing circuit through jack 12 and plug 16 and the timer relay 15 locks to its spacing position in response to the "start" pulse and remains locked until near the end of the "stop" pulse.

The repeater portion of the device includes, in addition to relay 14, source 17 of positive potential, say of 130 volts, resistors R3, R7 and R8, vacuum tube VT–2 and source 18 of negative potential, say of 24 volts; and the timer portion includes, in addition to relay 15, source 19 of negative potential, say of 130 volts, resistors R1, R2, R4 and R5, condenser C1, source 20 of positive potential, say of 130 volts, resistor R6, vacuum tube VT–1 and source 21 of negative potential, say of 24 volts, connected to the cathode of vacuum tube VT–1 through potentiometer P1. Source 22 of positive potential, say of 130 volts, variable resistor P2 and condenser C2 are common to both the repeater and timer portions of the device.

*Method of operation*

The converting device is designed to repeat the "start" and the first five selecting pulses of each of the six-unit signals incoming at jack 11 directly to a monitoring teletypewriter connected to output jack 12. An additional pulse is generated locally in the converting device and combined with the "stop" pulse at the end of the incoming six-unit start-stop signal to produce an elongated terminating, or "stop," pulse and this elongated pulse is transmitted immediately following the repeatered "start" and first five selecting pulses of the six-unit signal to the monitoring teletypewriter where the character recorded is determined by the first five significant elements of the six-unit signal. The elongated pulse is marking and serves in conjunction with the "start" pulse to maintain synchronism between the transmitter of the six-unit signals and the monitoring teletypewriter. The first five selecting pulses of the signal which respectively correspond to the five selecting pulses of the five-unit start-stop teletypewriter signal, contain the intelligence of the signals transmitted.

Line circuit 23 connects source 24 of six-unit signals through plug 13 and jack 11 to the main operating circuit which extends through the uppermost windings, in series, of repeater relay 14 and timer relay 15. The current in the uppermost windings of relays 14 and 15 is of a sufficient value, say of 60 milliamperes, to normally maintain both relays in their marking, or right-hand, positions as shown in the drawing. This current predominates over the biasing current normally flowing in the lowermost winding of each of the relays, the current in the lowermost winding of each relay being of a value, say of 30 milliamperes. Each relay is also provided with a middle winding which serves to aid the current in its associated uppermost winding in holding the relay in its marking position for locking purposes.

Repeater relay 14 receives in its uppermost winding the six-unit start-stop signal and repeats the "start" and first five selecting pulses of the signal to the output circuit extending to teletypewriter 25. The "start" pulse only of the six-unit signal is effective in the uppermost winding of timer relay 15, and relay 15, in response to the "start" pulse, operates to its spacing, or left-hand, position, under the influence of the 30-milliampere current flowing in its lowermost winding. Since relay 15 is normally in its marking position, source 22 of positive potential is normally connected to a circuit traceable through resistor P2, conductors 26, 27 and 28, marking contact and armature of relay 15, conductor 29, to source 19 of negative potential, and condenser C2 and the grids of vacuum tubes VT-1 and VT-2, which are connected to this circuit, are charged to a negative potential approaching, say of 130 volts. Thus when the device is in its normal condition the tubes are non-conducting and the middle windings of relays 14 and 15 are in a de-energized condition. However, as soon as the armature of relay 15 leaves its marking contact, potential source 19 is disconnected from potential source 22 and the charge of negative potential on condenser 22 begins to decrease in preparation for receiving a charge of positive potential. When the relay armature reaches its spacing, or left-hand, contact current flows from ground, through the lowermost winding of relay 15, resistor section R5, contact s and armature of relay 15, conductor 29, to grounded source 19. A current flowing in the lowermost winding of relay 15 is now increased from 30 milliamperes to 75 milliamperes and thereby maintains the relay in its spacing position for the duration of the incoming six-unit signal. The negative potential stored on condenser C2 upon discharging, reaches a negative value of 30 volts in approximately 132 milliseconds, the duration of the "start" pulse and the first five selecting pulses of the incoming signal. Also, it subsequently reaches a negative value of 15 volts in approximately 160 milliseconds which is almost the duration of a complete five-unit start-stop teletypewriter signal. The time duration in these discharging intervals is determined by adjusting the device for 53/60 transmission speed conversion.

At the end of the fifth selecting pulse of the incoming signal, which is 132 milliseconds after the "start" pulse operated relay 15 to its spacing position, the grid of vacuum tube VT-2 attains a potential value near that of 24 volts negative which is the potential at the associated cathode and the tube begins to conduct to thereby cause current to flow in a circuit traceable from grounded source 17 of positive potential, resistor section R8, through the middle winding of repeater relay 14, conductor 30, plate-cathode of tube VT-2, to grounded source 18, the current through the relay winding being in such a direction and of sufficient amplitude as to overcome the effect of the biasing current flowing through the lowermost winding of the relay. Relay 14 is therefore operated to and maintained in its marking position for the remainder of the six-unit signal, that is, for the duration of both the sixth selecting pulse and the "stop" pulse, to transmit to the teletypewriter an elongated "stop" pulse whereby a five-unit teletypewriter signal is recorded.

Relay 15 is still in its spacing position and vacuum tube VT-1, whose cathode is more positive than the cathode of vacuum tube VT-2, remains non-conductive until condenser C2 becomes almost completely discharged of the potential of negative polarity stored therein. Approximately 160 milliseconds after the "start" pulse operated timer relay 15 to its spacing position, the potential at condenser C2 and the grid of vacuum tube VT-1 reaches a value of about negative 15 volts and tube VT-1 conducts with a current flowing in the middle winding of the relay in such a direction and of such amplitude as to overcome the effect of the biasing current in the lowermost winding of timer relay 15, thereby operating relay 15 to its marking position, that is, to its "stop" position until the "start" pulse of the next succeeding incoming six-unit signal is received by relay 15. The circuit for operating relay 15 to its marking position at this time is traceable from grounded source 20 of positive potential, resistor R6, middle winding of relay 15, conductor 31, plate-cathode of tube VT-1, to the grounded voltage point on potentiometer P1.

Now that relay 15 is operated to its marking position the normally closed circuit is again energized, the circuit being traceable from grounded source 19 of negative potential, conductor 29, armature and marking contact of relay 15, conductors 28, 27 and 26, variable resistor P2, to grounded source 22 of positive potential. Condenser C2 and the grids of vacuum tubes VT-1 and VT-2 are again charged to a negative potential approaching 130 volts thereby suppressing the currents in the plate-cathode paths of vacuum tubes VT-1 and VT-2 and restoring the repeater relay 14 and timer relay 15 to their normal conditions, that is, under the control of the line current in their respective uppermost windings. Normally a closed "stop" pulse is in the process of transmission over the line circuit and the repeater relay 14 and the timer relay 15 are maintained in their marking positions until the "start" pulse of the next succeeding six-unit signal is received to recycle the converting device.

As is well known the five-unit code, when used with start and stop pulses for telegraph transmissions, affords thirty-two usable selecting combinations. In accordance with one of the commonly used five-unit codes, twenty-six of the thirty-two usable code combinations are assigned to the twenty-six letters of the alphabet and the remaining six codes are assigned to the space, carriage return, line feed, figures shift, letters shift and blank functions. The ten numeral digits and the punctuation marks are assigned in the upper case or figures shift selecting condition, lower case letters not being used, and the twenty-six letters of the alphabet being printed as capital letters in the lower case or letters shift selecting condition.

In the six-unit code as commonly used for the control of line casting and composing machines, the thirty-two code combinations which have the sixth selecting element of spacing nature are assigned to the twenty-six letters of the alphabet and to the same six functions enumerated above. The remaining thirty-two code combinations which have the sixth selecting element of marking nature are assigned to the ten numeral digits and to certain punctuation marks and to special functions that are peculiar to typesetting operations and that have no counterpart in ordinary teletypewriter operations. Since type-composing machines have both lower case and upper case characters, the lower case letters are selected in the letters shift or lower case selecting condition and the capital letters are selected in the upper case selecting condition. The numerals are selected in the lower case condition and certain punctuation marks and special characters are selected in the upper case or figures shift condition. The six functions that are common to teletypewriter apparatus and to line casting and composing machines are not selectively different for the upper case and lower case conditions and thus are not affected by the shift and unshift signals. The result is that a teletypewriter, responding to the first five significant elements of the six-unit code, will perform functions correctly in response to the six function signals. It will correctly record letters of the alphabet in response to six-unit code combinations having the sixth element of spacing nature as long as the last transmitted case condition signal was the unshift function signal. It will record numerals or punctuation marks when the last transmitted case condition signal has been the figures shift signal, instead of capital letters intended to be represented by the received signals. It will print letters of the alphabet in response to code combinations following the unshift signal and having the sixth selecting element of marking nature. Since in most instances a very large percentage of text material to be set in type is comprised of lower case letters, a teletypewriter printer operated under the control of the device embodying the present invention will correctly record that percentage of such text line-by-line in properly spaced words. It has been found in actual practice to be entirely adequate for general monitoring purposes. The sense of the text can be understood in almost all instances and the inability to record numerals when received signals represent numerals and the propensity for recording numerals where upper case letters are intended is not a serious disadvantage for ordinary monitoring purposes; in fact, the principal object in monitoring is to ascertain that transmission circuits and apparatus are free of trouble conditions, rather than to record fully intelligible text, and the described embodiment of the invention is well adapted to the accomplishment of this object.

What is claimed is:

1. In a telegraph repeater, a source of start-stop telegraph signals comprising a certain number of pulses, means for registering start-stop telegraph signals comprising a different number of pulses, means for repeating directly to said registering means certain of the pulses of a signal received from said source, timing means responsive to the start pulse of said signal for generating after a predetermined time interval a timed pulse, and means for utilizing said generated pulse to mark and nullify the remaining pulses of said signal for thereby qualifying said registering means to register an indication of the accuracy of said signal received from said source.

2. In a telegraph repeater, a source of start-stop signals comprising a number of pulses, means for registering start-stop signals comprising a different number of pulses, means for storing a potential charge between adjacent signals received from said source, means for repeating directly to said registering means certain of the pulses of a signal received from said source, other means responsive to the start pulse of said signal, locking means for maintaining said other means in its responded position for the duration of the signal, a plurality of means successively responsive to the discharge of the potential on said storing means upon the response of said other means, energizing means included in said repeating means and responsive to one of said plurality of means for maintaining said repeating means in a normal position for the duration of the remainder of the pulses of said signal from said source, energizing means included in said other means and responsive to another of said plurality of means for restoring said other means to its normal position at the termination of said signal from said source, and means operative during the interval of time between said responses of the two energizing means for transmitting an elongated "stop" pulse to said registering means for registration immediately following the registration of said certain pulses of said signal.

3. In a telegraph repeater, a source of start-stop signals of a certain number of pulses, means for registering start-stop signals of a different number of pulses, means for storing a potential charge between adjacent signals received from said source, means for repeating directly to said registering means certain of the pulses of a signal received from said source, other means responsive to the start pulse of said signal, locking means for maintaining said other means in its responded position for the duration of the signal, a plurality of space discharge devices arranged to successively conduct in response to the discharge of the potential on said storing means upon the response of said other means, energizing means included in said repeating means and responsive to the conduction of one of said space discharge devices for maintaining said repeating means in a normal position for the duration of the remainder of the pulses of said signal from said source, energizing means included in said other means and responsive to the conduction of another of said space discharge devices for restoring said other means to its normal position at the termination of said signal from said source, and means operative during the interval of time between said responses of the two energizing means for transmitting an elongated pulse to said registering means for registration immediately following the registration of said certain pulses of said signals.

4. In a telegraph repeater, a source of start-stop signals, each of a number of pulses, means for registering start-stop signals of a different number of pulses, means for storing a potential charge between adjacent signals received from said source, electromagnetic means for repeating directly to said registering means certain of the pulses of a signal received from said source, other electromagnetic means responsive to the start pulse of said signal, locking means for maintaining said other electromagnetic means in its operated position for the duration of the signal, a plurality of space discharge devices successively responsive to the discharge of the potential on said storing means upon the response of said other electromagnetic means, a winding on the first-mentioned electromagnetic means responsive to the conduction of one of said space discharge devices for maintaining said first-mentioned electromagnetic means in a normal position for the duration of the remainder of the pulses of said signal from said source, a winding on the second electromagnetic means responsive to the conduction of another of said space discharge devices for restoring said other electromagnetic means to its normal position at the termination of said signal from said source, and means operative during the interval of time between said responses of the two windings for transmitting an elongated "stop" pulse to said registering means for registration immediately following the registration of said certain pulses of said signal.

5. In a telegraph repeater, a source of start-stop signals of a certain number of pulses, a start-stop signal teletypewriter for registering signals of a different number of pulses, means for storing a potential charge between successive signals received from said source, electromagnetic means for repeating directly to said registering means certain of the pulses of a signal received from said source, other electromagnetic means responsive to the start pulse of said signal, locking means for maintaining said other electromagnetic means in its operating position for the duration of the signal, a plurality of space discharge devices arranged to successively conduct in response to the discharge of the potential on said storing means upon the response of said other electromagnetic means, a winding on the first-mentioned electromagnetic means responsive to the conduction of one of said space discharge devices for maintaining the first-mentioned electromagnetic means in a normal position for the duration of the remainder of the pulses of said signal from said source, a winding on the other electromagnetic means responsive to the conduction of another of said space discharge devices for restoring said other electromagnetic means to its normal position at the termination of said signal from said source, and means operative during the interval of time between said responses of the two windings for transmitting an elongated pulse to said registering means for registration immediately following the registration of said certain pulses of said signal.

6. In a telegraph system, a source of signals, a circuit connected to said source for translating a signal code of a number of elements into a code composed of a different number of elements, a monitoring device for receiving said different number of elements, repeating means connected to opposite ends of said circuit, timing means responsive to the start pulse only of a signal incoming over said circuit, a potentiometer connected to said timing means, a normally charged condenser connected to said potentiometer, operable means in said repeating means for repeating said different number of elements to said monitoring device, operable means in said timing means responsive to one element only of the signal incoming over said circuit for discharging said condenser, space discharge means responsive to a charge of a certain value appearing on said condenser during the course of discharging whereby the operable member of said repeating means is operated to and locked in its normal position until the start pulse of the next succeeding signal is received from said circuit, a second space discharge means responsive to a charge of another value appearing on said condenser during the discharging interval whereby the operable member of said timing means is operated to and locked in its normal position until the next succeeding signal is received from said circuit, and means operable in response to the locked condition of said repeating means and said timing means for terminating the said signal of a different number of elements received by said monitoring device.

7. In a telegraph system, a cyclically operable source of signals each comprising a start element, a predetermined number of significant elements and a stop element, a recorder operably responsive to signals each comprising a start element, a predetermined lesser number of significant elements and a stop element, said recorder including a rotary distributor set in operation in response to said start element and operable in cycles proportionately shorter than the cycles of said source of signals in accordance with said lesser number of significant elements, repeating means interconnecting said source and said recorder for repeating to said recorder signals from said source from the start element through said lesser number of significant elements, and means for inhibiting the starting of a new cycle by said distributor during the interval between its completion of a cycle and the completion of a cycle by said source of signals.

8. In a telegraph system, a source of signals each comprising a start element, a predetermined number of significant elements and a stop element, a recorder operably responsive to signals each comprising a start element, a predetermined lesser number of significant elements and a stop element, repeating means interconnecting said source and said recorder for repeating to said recorder signals from said source, and timing means for rendering said repeating means unresponsive to those of the significant elements from said source that exceed said lesser number of significant elements.

9. In a telegraph repeater, a source of telegraph signals according to a certain code system, means for registering telegraph signals according to a different code system, means for repeating directly to said registering means such pulses of a signal from said source as said registering means will accommodate, timing means responsive to the first pulse of said signal from said source for generating first and second timing pulses, means responsive to said first timing pulse for rendering said repeating means unresponsive to the remaining pulses of said signal from said source, and means responsive to said second timing pulse for requalifying said repeating means to respond to signal pulses.

References Cited in the file of this patent

UNITED STATES PATENTS 1,966,386    Haglund _____ July 10, 1934